US010250920B2

(12) United States Patent
Kamiya

(10) Patent No.: US 10,250,920 B2
(45) Date of Patent: Apr. 2, 2019

(54) IMAGE TRANSMISSION APPARATUS AND LINK STATUS CONFIRMATION METHOD

(71) Applicant: SONY CORPORATION, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/558,839

(22) PCT Filed: Feb. 12, 2016

(86) PCT No.: PCT/JP2016/000733
§ 371 (c)(1),
(2) Date: Sep. 15, 2017

(87) PCT Pub. No.: WO2016/151999
PCT Pub. Date: Sep. 29, 2016

(65) Prior Publication Data
US 2018/0084289 A1 Mar. 22, 2018

(30) Foreign Application Priority Data

Mar. 24, 2015 (JP) ................................ 2015-061564

(51) Int. Cl.
G09G 5/00 (2006.01)
H04N 21/2343 (2011.01)
H04N 21/236 (2011.01)
H04N 5/14 (2006.01)

(52) U.S. Cl.
CPC .......... H04N 21/2343 (2013.01); G09G 5/00 (2013.01); H04N 5/14 (2013.01); H04N 21/236 (2013.01)

(58) Field of Classification Search
CPC ..... H04N 21/2343; H04N 21/236; G09G 5/00
USPC .......... 345/1.1, 1.3, 172, 173, 174; 348/578, 348/723
See application file for complete search history.

(56) References Cited

U.S. PATENT DOCUMENTS 8,144,643 B2 * 3/2012 Miller ................. H04B 7/2041
370/316
8,745,285 B2 * 6/2014 Eguchi ............. H04N 21/43637
710/15
8,750,134 B2 * 6/2014 Kamiya .............. H04L 41/0677
370/241

(Continued)

FOREIGN PATENT DOCUMENTS

JP 11-296260 A 10/1999
JP 2012-096260 A 5/2012

OTHER PUBLICATIONS

Sony, "Solid-State Memory Camcorder PMW-F55 PMW-F5", Operating Instructions, 2013, 22 pages.

(Continued)

Primary Examiner — Trang U Tran
(74) Attorney, Agent, or Firm — Chip Law Group

(57) ABSTRACT

An image transmission apparatus includes a processor that superimposes a marker image for visualizing a connection status of a plurality of links between a transmission side and a reception side on an image displayed at the reception side at a specific position of an image frame, interleaves an image on which the marker image is superimposed for a predetermined pixel unit to divide the image into a plurality of signal streams, and transmits the signal streams via the plurality of links.

10 Claims, 15 Drawing Sheets

(56) References Cited

U.S. PATENT DOCUMENTS

| | | | |
|---|---|---|---|
| 8,964,791 B2* | 2/2015 | Vu | H04L 1/0008 370/504 |
| 2003/0130821 A1* | 7/2003 | Anslow | H04L 41/12 702/186 |

OTHER PUBLICATIONS

"TG4000 4K Test Signal Generator", ShibaSoku Co. Ltd., Mar. 27, 2014, 4 pages.
"TG4000 4K Signal Generator", Shiba Soku Co., Ltd., TG 4000,Ver. 1.5, Mar. 27, 2014, 4 pages.
"Solid-State Memory Camcorder PMW-F55 PMW-F5", 2013, 1-15, 70-74, 87 and 92 pages.
"TG4000 4K Signal Generator", Shiba Soku Co., Ltd., Ver. 1.5, Mar. 27, 2014, 4 pages.
International Search Report and Written Opinion of PCT Application No. PCT/JP2016/000733, dated Mar. 8, 2016, 9 pages. ISRWO.

\* cited by examiner

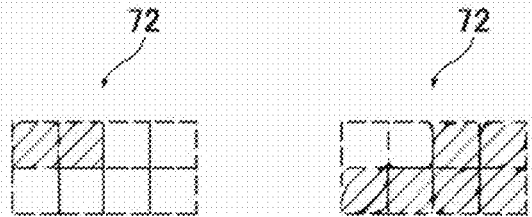

Minimum configuration pixel pattern constituting diagonal line 712a corresponding to link 1

FIG.7A

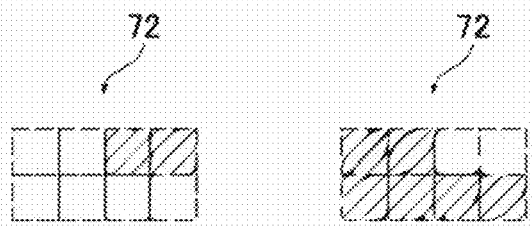

Minimum configuration pixel pattern constituting diagonal line 712b corresponding to link 2

FIG.7B

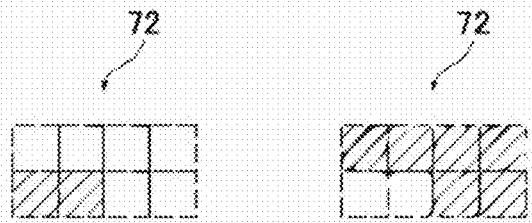

Minimum configuration pixel pattern constituting diagonal line 712c corresponding to link 3

FIG.7C

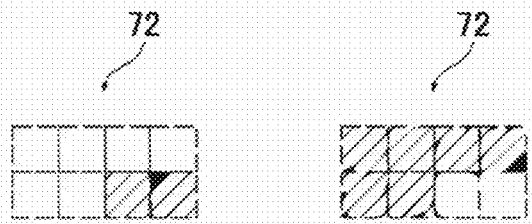

Minimum configuration pixel pattern constituting diagonal line 712d corresponding to link 4

FIG.7D

Connection confirmation pattern 713a corresponding to link 1

Connection confirmation pattern 713b corresponding to link 2

Connection confirmation pattern 713c corresponding to link 3

Connection confirmation pattern 713d corresponding to link 4

IMAGE TRANSMISSION APPARATUS AND LINK STATUS CONFIRMATION METHOD

CROSS REFERENCE TO RELATED APPLICATIONS

This application is a U.S. National Phase of International Patent Application No. PCT/JP2016/000733 filed on Feb. 12, 2016, which claims priority benefit of Japanese Patent Application No. JP 2015-061564 filed in the Japan Patent Office on Mar. 24, 2015. Each of the above-referenced applications is hereby incorporated herein by reference in its entirety.

TECHNICAL FIELD

The present technology relates to an image transmission apparatus such as a CCU (Camera Control Unit) and a link status confirmation method, for example, and more particularly to an image transmission apparatus and a link status confirmation method that can transmit an image by using, for example, a 2-Sample-Interleave-Division method or the like.

BACKGROUND ART

In order to establish a connection between connecting connectors or between devices in a correspondence relationship, there is a method to allocate identification information to the connecting connectors. For example, identification information of a first device for connection and identification information of a connection connector disposed at the first device are transmitted to a second device connected through a cable. In the second device, a correspondence relationship between the identification information of the first device and the identification information of the connecting connector disposed at the first device is managed. The second device determines whether or not a pair of the identification information of the first device and the identification information of the connecting connector disposed at the first device is matched with the correspondence relationship. If it is no matched, it is determined that it is connected to a device or a connecting connector that is not a target (for example, see Patent Literature 1).

CITATION LIST

Patent Literature

Patent Literature 1: Japanese Patent Application Laid-open No. 11-296260

DISCLOSURE OF INVENTION

Technical Problem

The present technology solves a variety of problems that may be generated in a case where an image is interleaved for a unit of a predetermined number of pixels to divide the image into a plurality of signal streams, which are transmitted via a plurality of links.

Solution to Problem

The present technology is made in view of the above-mentioned circumstances, and it is an object of the present technology to provide an image transmission apparatus including a processor that superimposes a marker image for visualizing a connection status of a plurality of links between a transmission side and a reception side on an image displayed at the reception side at a specific position of an image frame, interleaves an image on which the marker image is superimposed for a unit of a predetermined number of pixels to divide the image into a plurality of signal streams, and transmits the signal streams via the plurality of links.

The marker image may include a first pattern configured to visualize right or wrong of the connection status of the plurality of links.

The marker image may include a second pattern configured to visualize the link that a connection correspondence relationship is wrong.

The marker image may include a third pattern configured to visualize an unconnected link.

The marker image may be configured by a combination of a pixel having a maximum luminance value and a pixel having a minimum luminance value.

The processor may be configured to divide the image into four signal streams by using the 2-Sample-Interleave-Division method and to transmit the divided respective signal streams using four links.

In this case, in the second pattern, two pixel values of a corresponding link have a relative relationship with six pixel values of other links.

The third pattern may include four connection confirmation patterns corresponding to the respective four links, and in each of the connection confirmation patterns, two pixel values allocated to the link corresponding to itself are exclusively maximum values.

The processor may be configured to superimpose the marker image by a positional relationship that an odd-numbered frame of the image and an even-numbered frame of the image are spatially exclusive, interleave the image of the odd-numbered frame and the image of the even-numbered frame after the marker image is superimposed, divide the images into a plurality of signal streams, and transmit the signal streams via the plurality of links.

A link status confirmation method according to the present technology by a processor including superimposing a marker image for visualizing a connection status of a plurality of links between a transmission side and a reception side on an image displayed at the reception side at a specific position of an image frame, interleaving an image on which the marker image is superimposed a unit of a predetermined number of pixels to divide the image into a plurality of signal streams, and transmitting the signal streams via the plurality of links.

Advantageous Effects of Invention

As described above, the present technology can solve a variety of problems that may be generated in a case where an image is interleaved for a unit of a predetermined number of pixels to divide the image into a plurality of signal streams, which are transmitted via a plurality of links.

Effects described herein are not limited only to be illustrative, there may be effects other than those described herein.

BRIEF DESCRIPTION OF DRAWINGS

FIG. 7A is a diagram showing two patterns of a minimum configuration pixel 72 used to form a diagonal line 712a corresponding to a link 1 among four diagonal lines 712a, 712b, 712c, and 712d of the diamond pattern 712.

FIG. 7B is similarly a diagram showing two patterns of the minimum configuration pixel 72 used to form a diagonal line 712b corresponding to a link 2.

FIG. 7C is similarly a diagram showing two patterns of the minimum configuration pixel 72 used to form a diagonal line 712c corresponding to a link 3.

FIG. 7D is similarly a diagram showing two patterns of the minimum configuration pixel 72 used to form a diagonal line 712d corresponding to a link 4.

MODE(S) FOR CARRYING OUT THE INVENTION

Hereinafter, embodiments according to the present technology will be described with reference to the drawings.

[2-Sample-Interleave-Division]

One method of divisionally transmitting 4K/60P images is 2-Sample-Interleave-Division.

Figure 1:
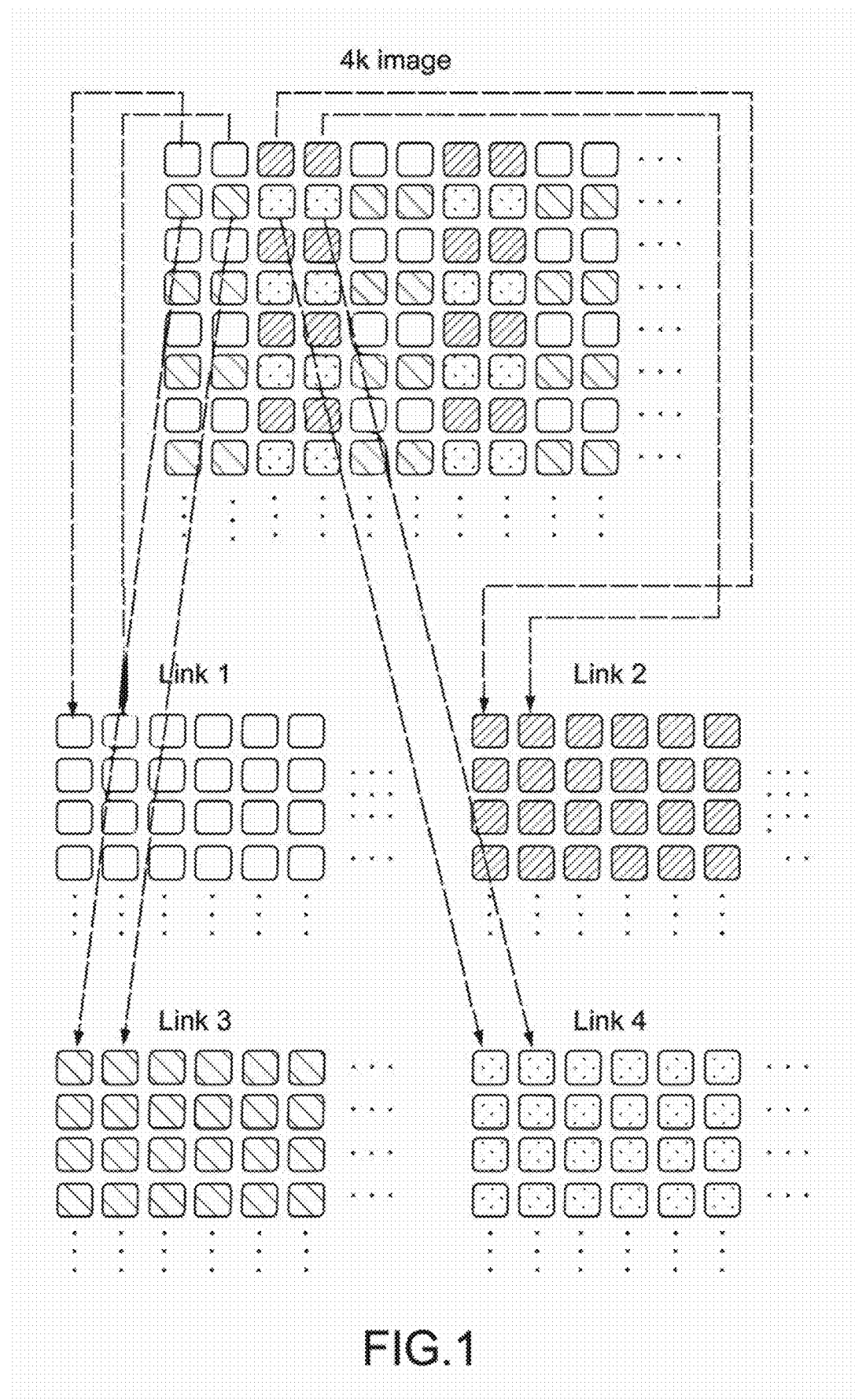
FIG. 1 is a diagram showing the 2-Sample-Interleave-Division.

FIG. 1 is a diagram showing the 2-Sample-Interleave-Division.

The 2-Sample-Interleave-Division is a method of transmitting 4K images by using four links in total. Specifically, groups of two pixels next to each other in the horizontal direction are alternately extracted from a 4K image pixel arrangement, one groups of the two pixels are allocated to a link 1 and transmitted, and the other groups of the two pixels are allocated to a link 2 and transmitted. Groups of two pixels next to each other of a next column in the horizontal direction are alternately extracted, and one groups of the two pixels are allocated to a link 3 and transmitted, and so forth.

[4K Camera System]

Figure 2:
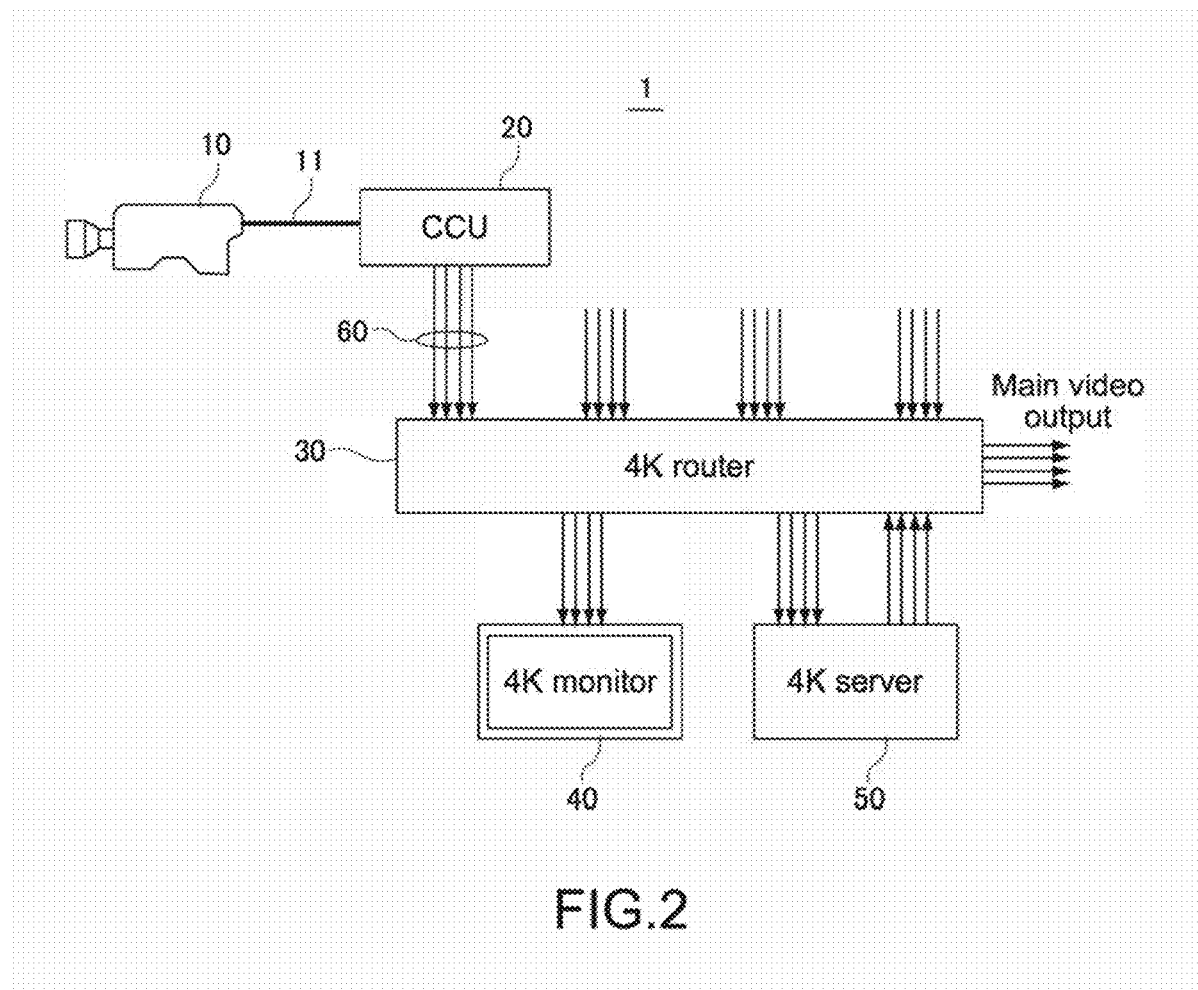
FIG. 2 is a diagram showing a configuration of 4K camera system 1 according to the present technology.

FIG. 2 is a diagram showing a configuration of 4K camera system 1 that employs the 2-Sample-Interleave-Division.

The 4K camera system 1 includes a 4K camera 10 CCU (Camera Control Unit) 20, a 4K router 30, a 4K monitor 40, a 4K server 50, and the like.

The 4K camera 10 is a camera that can capture 60 frames of 4K images per seconds.

The 4K camera 10 transmits the captured 4K image signals to the CCU 20 (image transmission apparatus) through a camera cable 11 such as an optical fiber cable.

The CCU 20 performs a variety of processing on the 4K image signals transmitted from the 4K camera 10, and performs a variety of adjustments of the connected 4K camera 10. Also, the CCU 20 divides the 4K image signals transmitted from the 4K camera 10 into four signal streams by using the 2-Sample-Interleave-Division method, and transmits the divided respective signal streams to the 4K router 30 using four 3G-SDI links 60.

Furthermore, the CCU 20 can transmit color bar signals each having a 4K size. For example, at the time of transmitting the color bar signals, the CCU 20 generates the color bar signals by superimposing a 2SI-DIAMOND-Marker (hereinafter referred to as a "marker image") for visualizing a connection status of a plurality of cables corresponding to each of the four 3G-SDI links 60 that connect a transmission side and a reception side on an image displayed at the reception side, divides the image into the four signal streams by using the 2-Sample-Interleave-Division method, and transmits the divided each signal stream to the 4K router 30 using the four 3G-SDI links 60. Note that a functional configuration of the CCU 20 will be described later in more detail.

The 4K router 30 makes a route of the plurality of 4K images output from the CCU 20 and the 4K server 50 to the 4K monitor 40, the 4K server 50, a main video output, or the like.

The 4K monitor 40 is a monitor having a resolution such that the 4K images can be displayed.

The 4K server 50 is a server that can accumulate or read-out the 4K images.

[Configuration of CCU 20]

Figure 3:
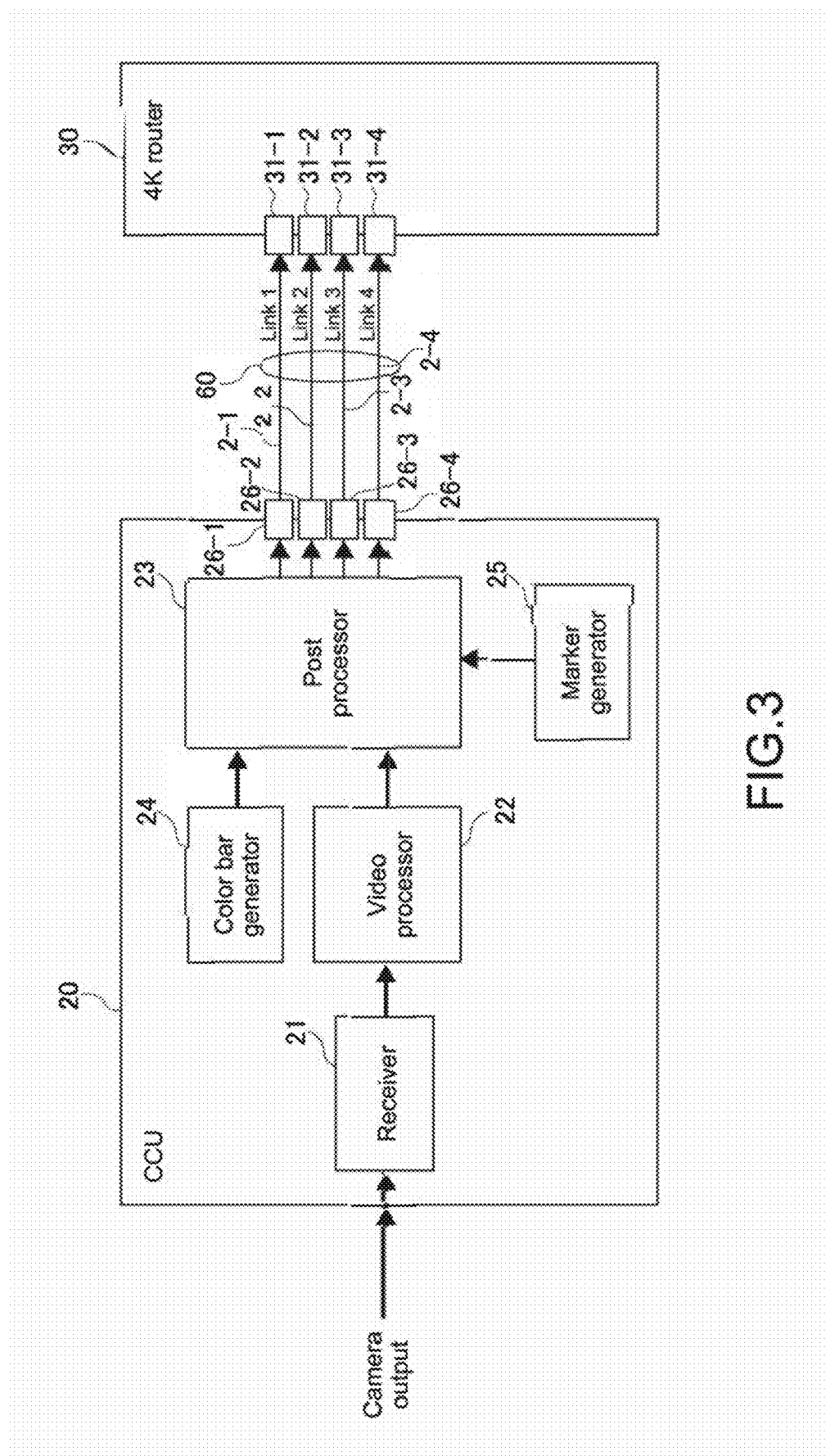
FIG. 3 is a block diagram showing a configuration of a CCU 20 in relation to video processing and transmission processing in the 4K camera system 1 of FIG. 2.

FIG. 3 is a block diagram showing a configuration of the CCU 20 in relation to video processing and transmission processing.

The CCU 20 includes a receiver 21, a video processor 22, a post processor 23 (corresponds to the processor according to the present technology), a color bar generator 24, a marker generator 25, and four cable connectors 26-1, 26-2, 26-3, and 26-4 corresponding to the respective four 3G-SDI links 60.

The receiver 21 receives the 4K image signals transmitted from the 4K camera 10 through the camera cable 11.

The video processor 22 performs a variety of processing on the received 4K image signals concerning image quality, exposure, and the like.

The color bar generator 24 feeds the 4K color bar signals to the post processor 23 in accordance with a color bar output instruction.

The marker generator 25 feeds the marker image superimposed on a specific position of the 4K color bar signals to the post processor 23 in accordance with the color bar output instruction.

The post processor 23 performs processing on the 4K image signals output from the video processor 22 to divide the 4K image signals into the four signal streams by using the 2-Sample-Interleave-Division method and to transmit the divided four signal streams via the four 3G-SDI links. Also, when the color bar output instruction is issued, the post processor 23 superimposes the marker image generated by the marker generator 25 on a spatial specific position of the color bar signals generated by the color bar generator 24 to divide the marker image into the four signal streams by using the 2-Sample-Interleave-Division method and to output the four signal streams.

The cable connectors 26-1, 26-2, 26-3, and 26-4 corresponding to the four 3G-SDI links 60 respectively are connected to four cable connectors 31-1, 31-2, 31-3, and 31-4 provided on the 4K router 30 through coaxial cables 2-1, 2-2, 2-3, and 2-4. The 4K images divided into the four signal streams by the post processor 23 by using the 2-Sample-Interleave-Division method are transmitted to the 4K router 30 through the coaxial cables 2-1, 2-2, 2-3, and 2-4.

[Cable Connection Error and Detection Easiness Thereof]

As described above, the four cable connectors 26-1, 26-2, 26-3, and 26-4 of the CCU 20 are connected to the four cable connectors 31-1, 31-2, 31-3, and 31-4 of the 4K router 30 through the coaxial cables 2-1, 2-2, 2-3, and 2-4 so that the links allocated to the respective connectors are matched each other. In this regard, as the respective coaxial cables 2-1, 2-2, 2-3, and 2-4 are manually connected, a connection error may occur. For example, the cable connector 26-1 of the CCU 20 to which the link 1 is allocated is connected to the cable connector 31-2 of the 4K router 30 to which the link 2 is allocated through a coaxial cable, the cable connector 26-2 of the CCU 20 to which the link 2 is allocated is connected to the cable connector 31-1 of the 4K router 30 to which the link 1 is allocated through a coaxial cable, or the like.

With respect to the cable connection, in a case where images, which are simply spatially divided, for example, are transmitted via a plurality of links and a cable connection error occurs, the cable connection error can be visually found relatively easily from a strange appearance of the images displayed at the reception side. However, in a case where the images are interleaved for a unit of a predetermined number of pixels and divisionally transmitted by using the 2-Sample-Interleave-Division method, the cable connection error cannot be easily found from the appearance of the images displayed at the reception side. In particular, since the 2-Sample-Interleave-Division method performs interleaving for a unit of two pixels, it is very difficult to find the cable connection error from the appearance of the images.

In view of the above, the post processor 23 of the CCU 20 according to the embodiment generates color bar signals on which a marker image is superimposed for visualizing the images that display, at the reception side, the connection status of the four 3G-SDI links 60 connecting between the transmission side and the reception side, divides the color bar signals into four signal streams by using the 2-Sample-Interleave-Division method, and transmits the four signal streams via four 3G-SDI links 60. Hereinafter, the four 3G-SDI links 60 are referred to as "link 1", "link 2", "link 3", and "link 4".

[Marker Image]

Figure 4:
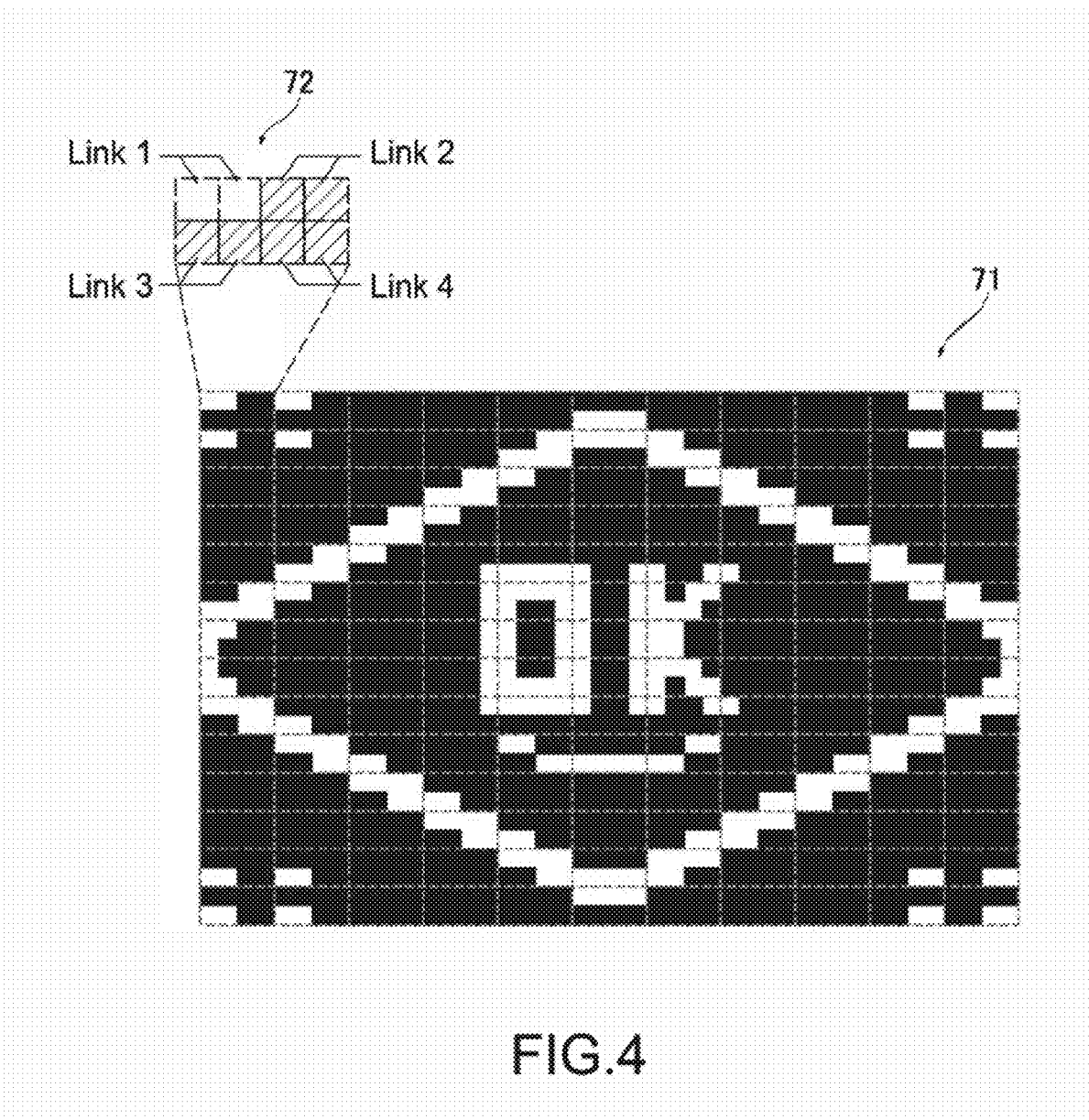
FIG. 4 is a diagram showing a pattern example of a marker image 71.

FIG. 4 is a diagram showing a pattern example of the marker image 71.

The marker image 71 shown in FIG. 4 is a pattern that the four cable connectors 26-1, 26-2, 26-3, and 26-4 of the CCU 20 are connected to the four cable connectors 31-1, 31-2, 31-3, and 31-4 of the 4K router through the four coaxial cables 2-1, 2-2, 2-3, and 2-4 in a right correspondence relationship.

The marker image 71 is a rectangular binary image including, for example, 28 pixels in columns and 44 pixels in rows. Each pixel has a value for white (maximum luminance value) or black (minimum luminance value).

It can be considered that the marker image 71 includes minimum configuration pixels 72, each of which includes a block of eight pixels, i.e., two pixels in a row and four pixels in a column in view of the characteristics of the 2-Sample-Interleave-Division method. Specifically, the values of the two pixels arranged upper left in a row are allocated to the link 1, the values of the two pixels arranged upper right in a row are allocated to the link 2, the values of the two pixels arranged lower left in a row are allocated to the link 3, and the values of the two pixels arranged lower right in a row are allocated to the link 4 in the minimum configuration pixel 72, and the respective values are divisionally transmitted. The marker image 71 is constituted by arranging 11 minimum configuration pixels 72 in rows and 14 minimum configuration pixels 72 in columns.

The marker image 71 mainly includes the following three pattern elements.

1. OK pattern
2. Diamond pattern
3. Connection confirmation pattern

Figure 5:
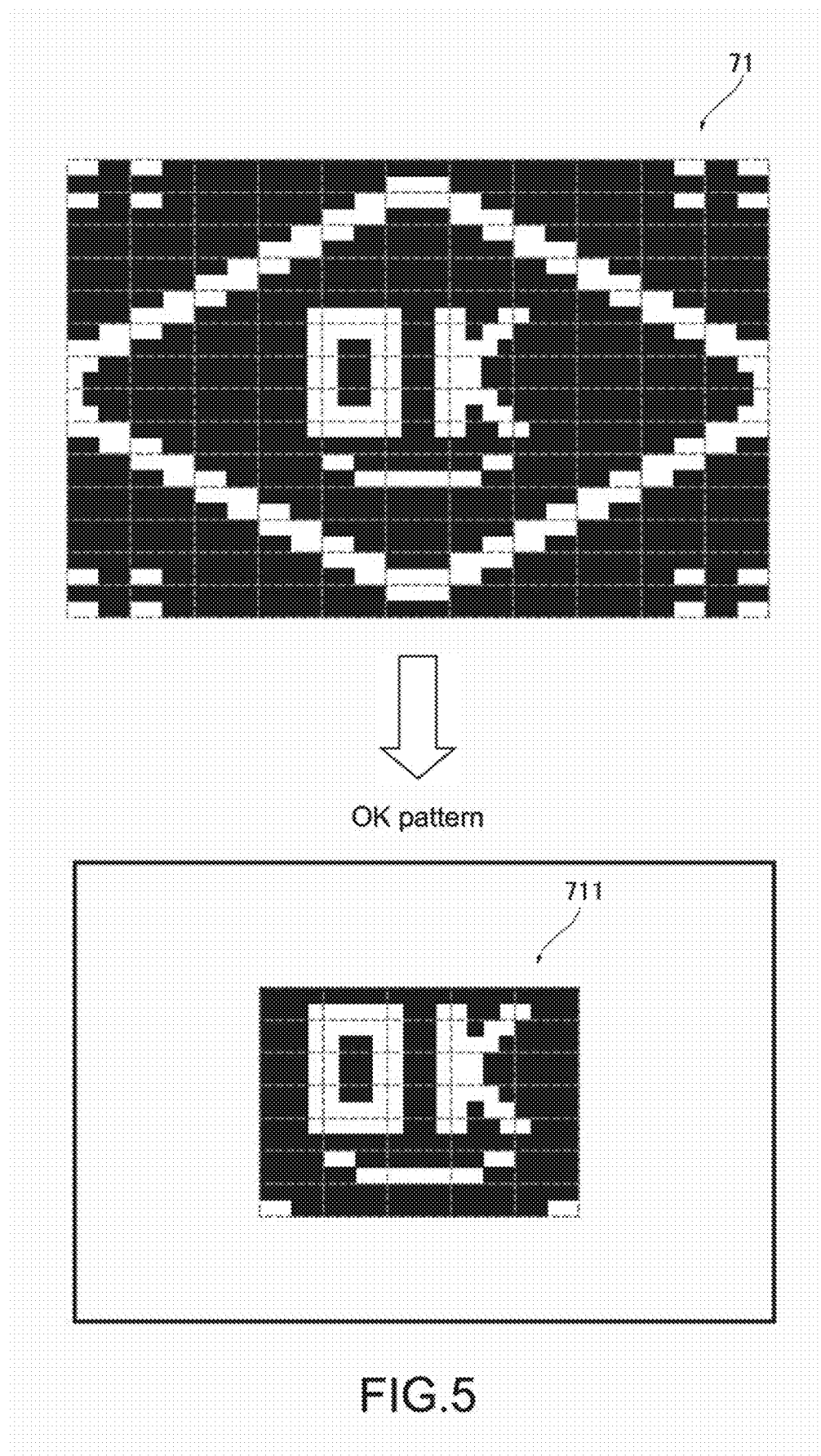
FIG. 5 is a diagram showing the marker image 71 and an OK pattern 711 extracted from the marker image 71.

FIG. 5 is a diagram showing the marker image 71 and an OK pattern 711 extracted from the marker image 71.

The OK pattern 711 (first pattern) is a pattern configured to visualize right or wrong of the connection status of the plurality of links between the CCU 20 and the 4K router 30.

More specifically, the OK pattern 711 is a pattern configured such that a user can visually recognize the character "OK" only in a case where the four cable connectors 26-1, 26-2, 26-3, and 26-4 of the CCU 20 are connected to the four cable connectors 31-1, 31-2, 31-3, and 31-44 of the 4K router 30 through the four coaxial cables 2-1, 2-2, 2-3, and 2-4 in a right correspondence relationship. In other words, the OK pattern 711 has a pattern that the form is broken and the word "OK" cannot be visually recognized upon displaying at the reception side in a case where even one cable has a connection error or any cable is unconnected.

Figure 6:
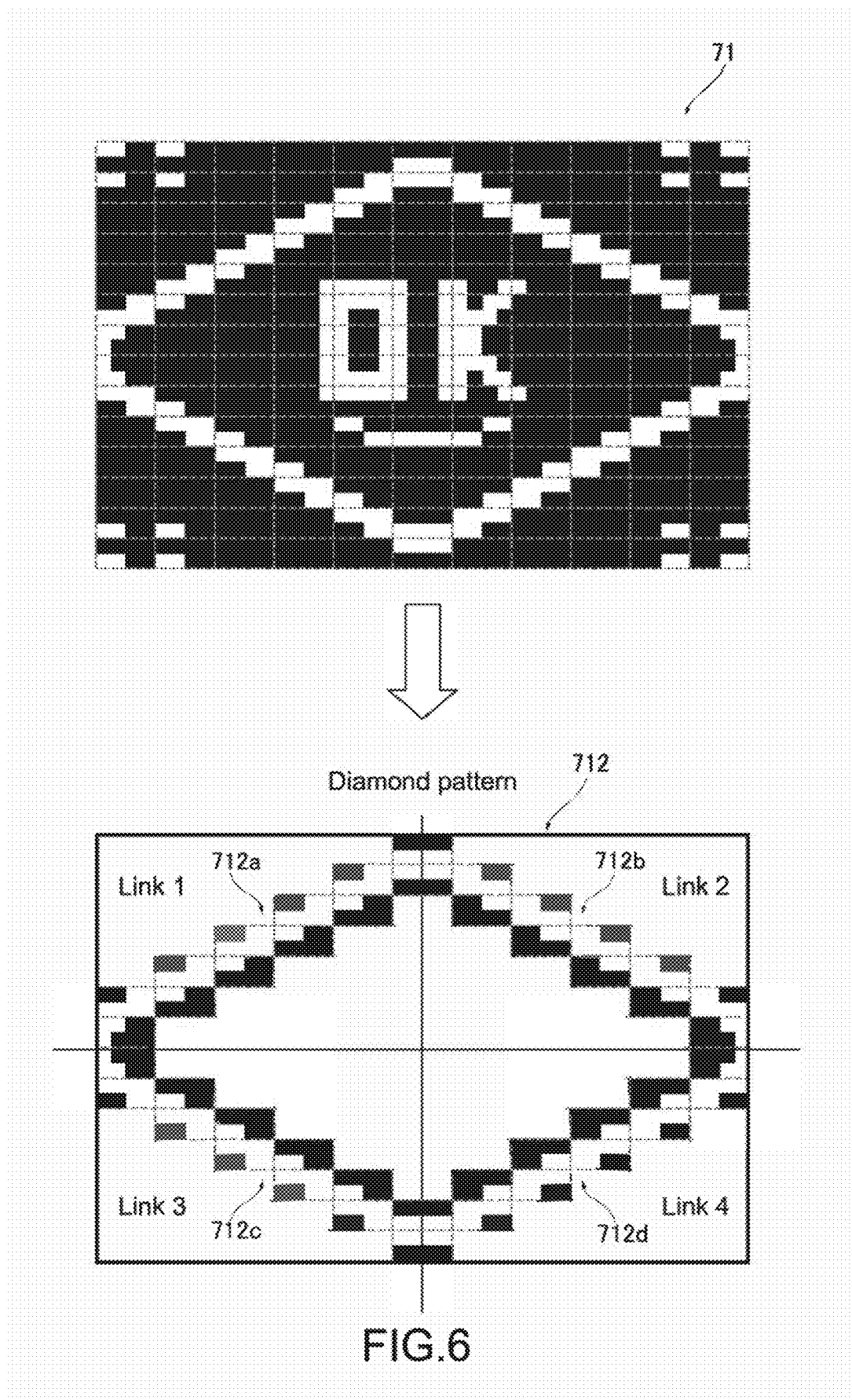
FIG. 6 is a diagram showing the marker image 71 and a diamond pattern 712 extracted from the marker image 71.

FIG. 6 is a diagram showing the marker image 71 and a diamond pattern 712 extracted from the marker image 71.

The diamond pattern 712 (second pattern) is a pattern configured to visualize the link that a connection correspondence relationship with the reception side is wrong. More specifically, the diamond pattern 712 is constituted by combining four diagonal lines 712a, 712b, 712c, and 712d in a diamond shape such that a user can visually recognize a link in which the connection correspondence relationship with the reception side is wrong. In a case where the pattern of the marker image 71 is divided into 2 by 2 in a row and a column, the diagonal line 712a arranged at an upper left divided area corresponds to the link 1, the diagonal line 712b arranged at an upper right divided area corresponds to the link 2, the diagonal line 712c arranged at a lower left divided area corresponds to the link 3, and the diagonal line 712d arranged at a lower left divided area corresponds to the link 4. Each of the four diagonal lines 712a, 712b, 712c, and 712d has a pattern that the form is broken in a case where the corresponding link has a wrong connection in view of the correspondence relationship with the reception side.

FIG. 7A is a diagram showing two patterns of the minimum configuration pixel 72 used to form the diagonal line 712a corresponding to the link 1 among the diagonal lines 712a, 712b, 712c, and 712d of the diamond pattern 712. Similarly, FIG. 7B is a diagram showing two patterns of the minimum configuration pixel 72 used to form the diagonal line 712b corresponding to the link 2 among the diagonal lines 712a, 712b, 712c, and 712d of the diamond pattern 712. Similarly, FIG. 7C is a diagram showing two patterns of the minimum configuration pixel 72 used to form the diagonal line 712c corresponding to the link 3 among the diagonal lines 712a, 712b, 712c, and 712d of the diamond pattern 712. Similarly, FIG. 7D is a diagram showing two patterns of the minimum configuration pixel 72 used to form the diagonal line 712d corresponding to the link 4 among the diagonal lines 712a, 712b, 712c, and 712d of the diamond pattern 712.

In the two patterns of the minimum configuration pixel 72 used to form the patterns of the diagonal lines 712a, 712b, 712c, and 712d, two pixel values of the corresponding link have a relative relationship with six pixel values of the other links. Accordingly, even if another link is connected such that the connection correspondence relationship with the reception side is wrong, the diagonal line pattern corresponding to the right correspondence relationship does not change. In other words, since only the form of the diagonal line corresponding to the link where the connection correspondence relationship is wrong is broken, the link having the wrong connection can be visualized.

Figure 8:
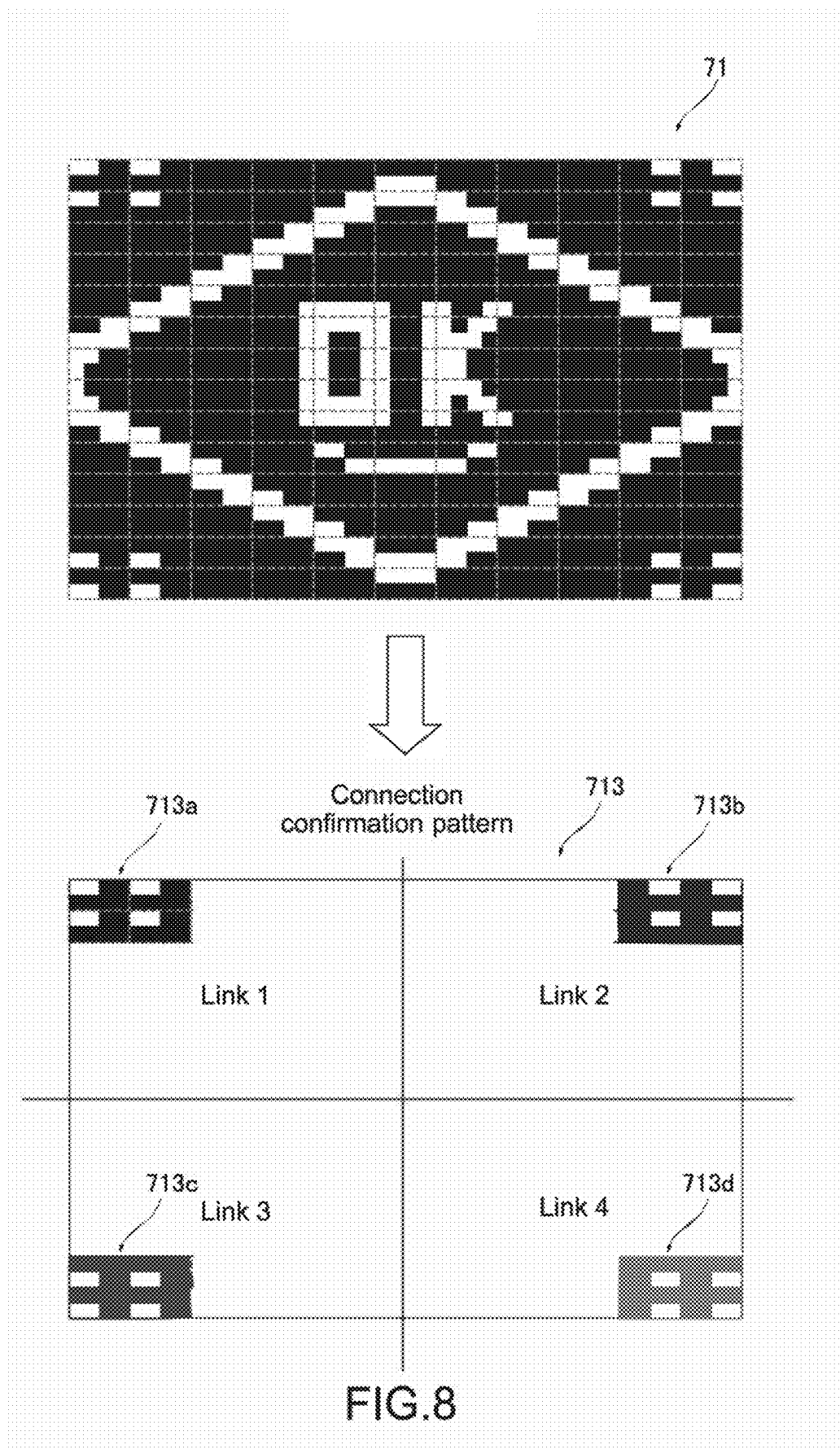
FIG. 8 is a diagram showing the marker image 71 and connection confirmation patterns 713 extracted from the marker image 71.

FIG. 8 is a diagram showing the marker image 71 and connection confirmation patterns 713 extracted from the marker image 71. The connection confirmation patterns 713 include four connection confirmation patterns 713a, 713b, 713c, and 713d corresponding to the respective links. The connection confirmation patterns 713a, 713b, 713c, and 713d corresponding to the respective links are patterns to visualize the unconnected links.

The connection confirmation patterns 713a, 713b, 713c, and 713d corresponding to the respective links are arranged at four corners of the marker image 71. The four corners of the marker image 71 belong to the four divided areas corresponding to the respective links. Each of the connection confirmation patterns 713a, 713b, 713c, and 713d corresponding to the respective links has a pattern that the pattern is undisplayed in a case where the corresponding link is not connected, i.e., the corresponding cable connector of the CCU 20 is not connected to the 4K router 30 through the coaxial cable.

Figure 9A:
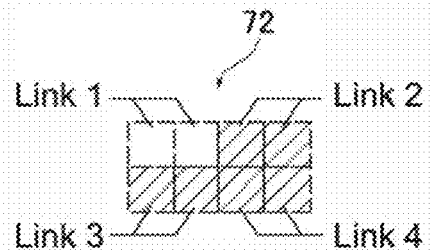
FIG. 9A is a diagram showing a pattern of the minimum configuration pixel 72 constituting a connection confirmation pattern 713a corresponding to the link 1 among four connection confirmation patterns 713.
Figure 9B:
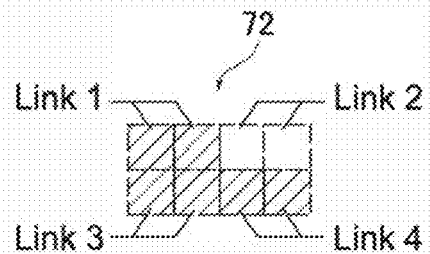
FIG. 9B is similarly a diagram showing a pattern of the minimum configuration pixel 72 constituting a connection confirmation pattern 713b corresponding to a link 2.
Figure 9C:
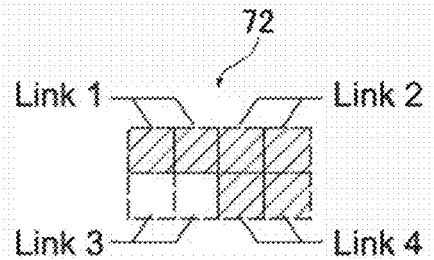
FIG. 9C is similarly a diagram showing a pattern of the minimum configuration pixel 72 constituting a connection confirmation pattern 713c corresponding to a link 3.
Figure 9D:
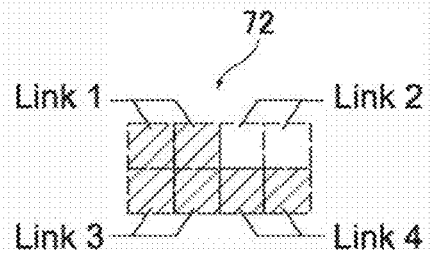
FIG. 9D is similarly a diagram showing a pattern of the minimum configuration pixel 72 constituting a connection confirmation pattern 713d corresponding to a link 4.

FIG. 9A is a diagram showing a pattern of the minimum configuration pixel 72 constituting the connection confirmation pattern 713a corresponding to the link 1 among the four connection confirmation patterns 713. Similarly, FIG. 9B is a diagram showing a pattern of the minimum configuration pixel 72 constituting the connection confirmation pattern 713b corresponding to the link 2. Similarly, FIG. 9C is a diagram showing a pattern of the minimum configuration pixel 72 constituting the connection confirmation pattern 713c corresponding to the link 3. Similarly, FIG. 9D is a diagram showing a pattern of the minimum configuration pixel 72 constituting the connection confirmation pattern 713d corresponding to the link 4.

In the pattern of the minimum configuration pixel 72 used as each of the connection confirmation patterns 713, only the two pixel values allocated to the own link are maximum luminance values (white) and the other six pixel values are minimum luminance values (black). Thus, if all the four cable connectors 26-1, 26-2, 26-3, and 26-4 of the CCU 20 are connected to the four cable connectors 31-1, 31-2, 31-3, and 31-4 of the 4K router through the four coaxial cables 2-1, 2-2, 2-3, and 2-4 in a right correspondence relationship, the connection confirmation patterns 713a, 713b, 713c, and 713d of FIG. 9 are displayed at the four corners of the marker image 71.

Also, even if all the links are not connected in the right correspondence relationship but are in the connection status, the four connection confirmation patterns 713a, 713b, 713c, and 713d having the maximum luminance values (white) of which positions are changed are displayed at the four corners of the marker image 71.

Figure 10:
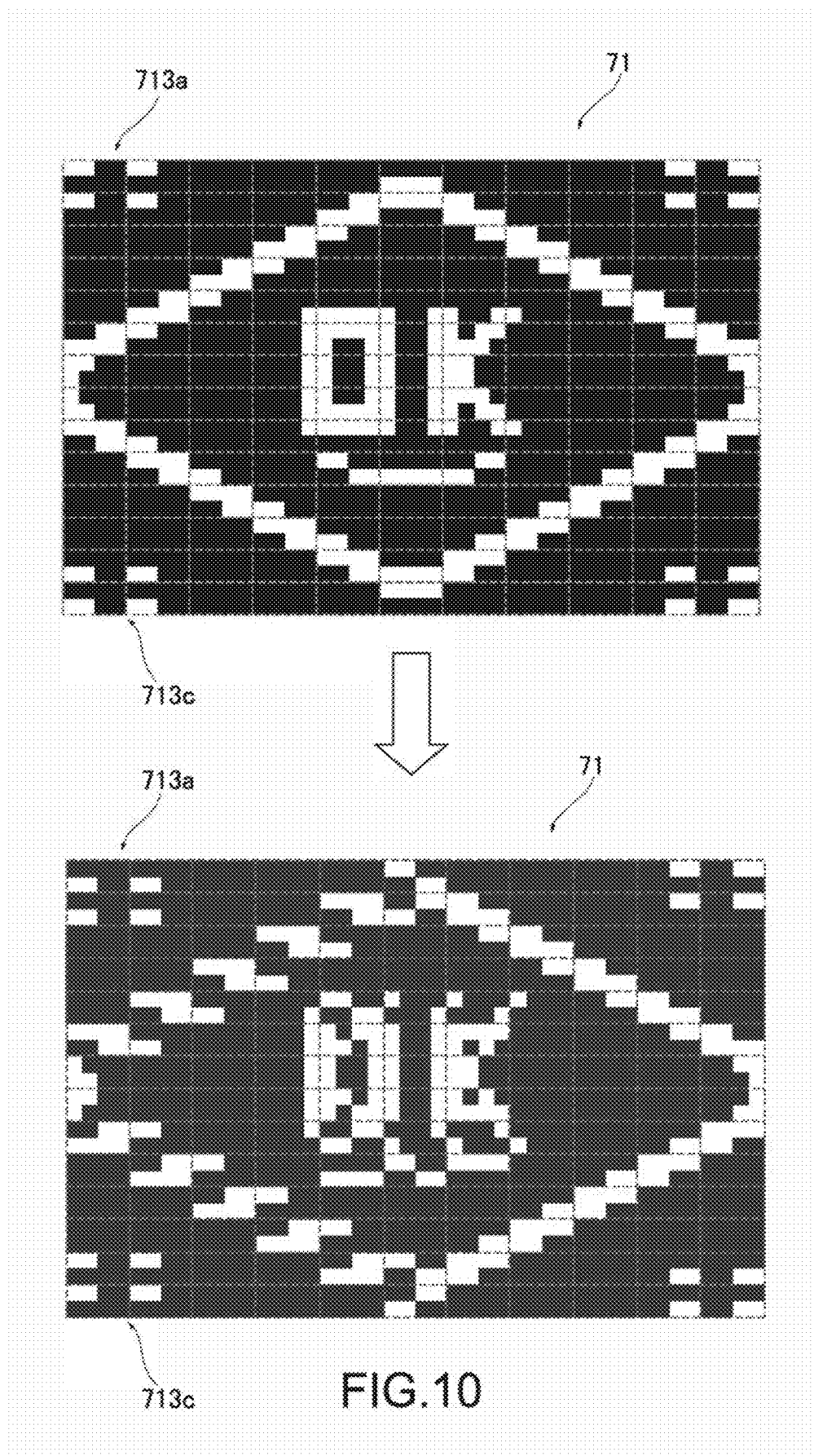
FIG. 10 is a diagram showing the connection confirmation patterns 713 in a case where a cable connector 31-3 of a 4K router 30 is connected to a cable connector 26-1 of the CCU 20, and a cable connector 31-1 of the 4K router 30 is connected to a cable connector 26-3 of the CCU 20.

FIG. 10 is a diagram showing the connection confirmation patterns 713 in a case where a cable connector 31-3 of the 4K router 30 is connected to the cable connector 26-1 of the CCU 20, and a cable connector 31-1 of the 4K router 30 is connected to the cable connector 26-3 of the CCU 20.

In this case, in the connection confirmation pattern 713a and the connection confirmation pattern 713c, only the positions of the pixels having the maximum luminance values (white) are changed, and the appearance of the connection confirmation patterns 713 is less changed.

In contrast, in a case where there is an unconnected link, the two pixel values, to which the link (e.g., link 2) is allocated have the minimum luminance values (black). Therefore, all pixel values of the connection confirmation pattern (e.g., connection confirmation pattern 713b) corresponding to the link have the minimum luminance values (black). In the marker image 71, the connection confirmation pattern is undisplayed (see FIG. 13).

Thus, the unconnected link can be easily recognized by the connection confirmation patterns 713.

(Display Example 1 of Marker Image 71 Upon Cable Connection Error)

Figure 11:
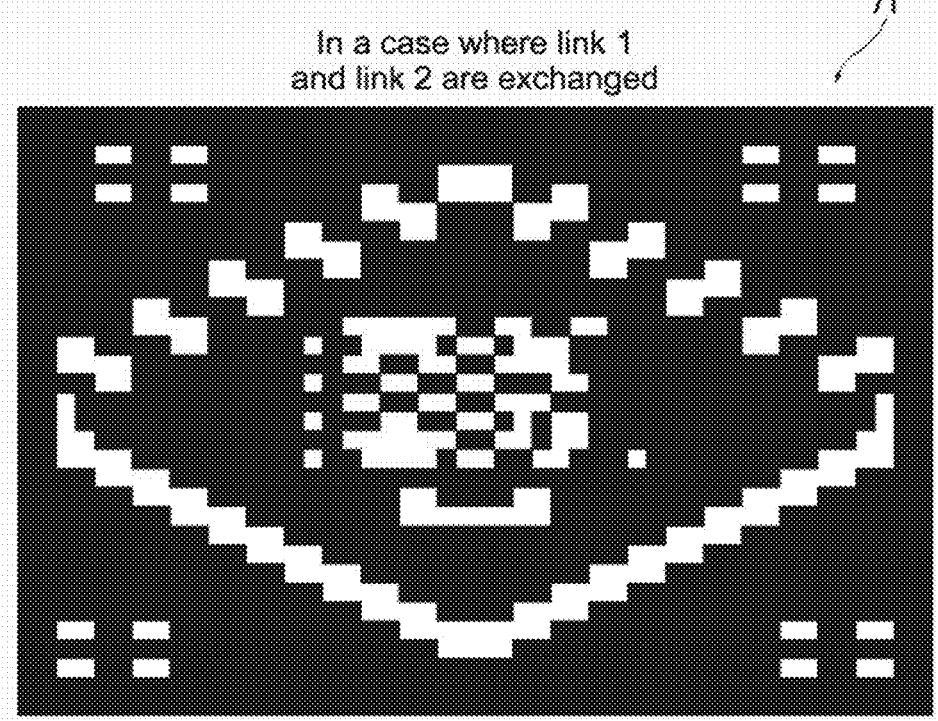
FIG. 11 is a diagram showing the marker image 71 in a case where a connection is made by exchanging the link 1 and the link 2.

FIG. 11 is a diagram showing the marker image 71 in a case where the connection is made by exchanging the link 1 and the link 2.

In a case where the connection is made by exhanging the link 1 and the link 2, the OK pattern 711 of the marker image 71 is broken and the character "OK" is unreadable. This allows the user to recognize that any one of the four links is not correctly connected.

In addition, in a case where the connection is made by exhanging the link 1 and the link 2, in the diamond pattern 712, the forms of the diagonal line 712a arranged at the upper left divided area corresponds to the link 1 and the diagonal line 712b arranged at the upper right divided area corresponds to the link 2 are broken. This allows the user to recognize that the cable connections of the link 1 and the link 2 are in error, i.e., the link 1 and the link 2 are exchanged and connected.

(Display Example 2 of Marker Image 71 Upon Cable Connection Error)

Figure 12:
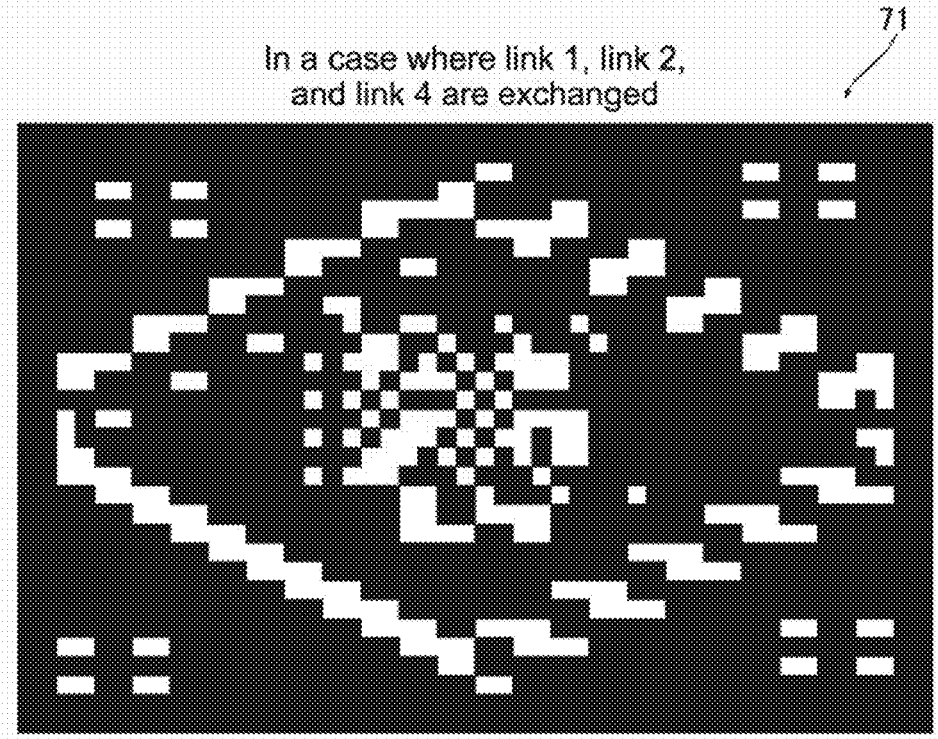
FIG. 12 is a diagram showing the marker image 71 in a case where the connection is made by exchanging the link 1, the link 2, and the link 4.

FIG. 12 is a diagram showing the marker image 71 in a case where the connection is made by exchanging the link 1, the link 2, and the link 4.

Also in this case, the OK pattern 711 of the marker image 71 is broken. This allows the user to recognize that any one of the four links is not correctly connected.

In addition, in this case, in the diamond pattern 712, the forms of the diagonal line 712a arranged at the upper left divided area corresponding to the link 1, the diagonal line 712b arranged at the upper right divided area corresponding to the link 2, and the diagonal line 712d arranged at the lower right divided area corresponding to the link 4 are broken. This allows the user to recognize that the cable connections of the link 1, the link 2, and the link 4 are exchanged and connected.

(Display Example 3 of Marker Image 71 Upon Cable Unconnection)

Figure 13:
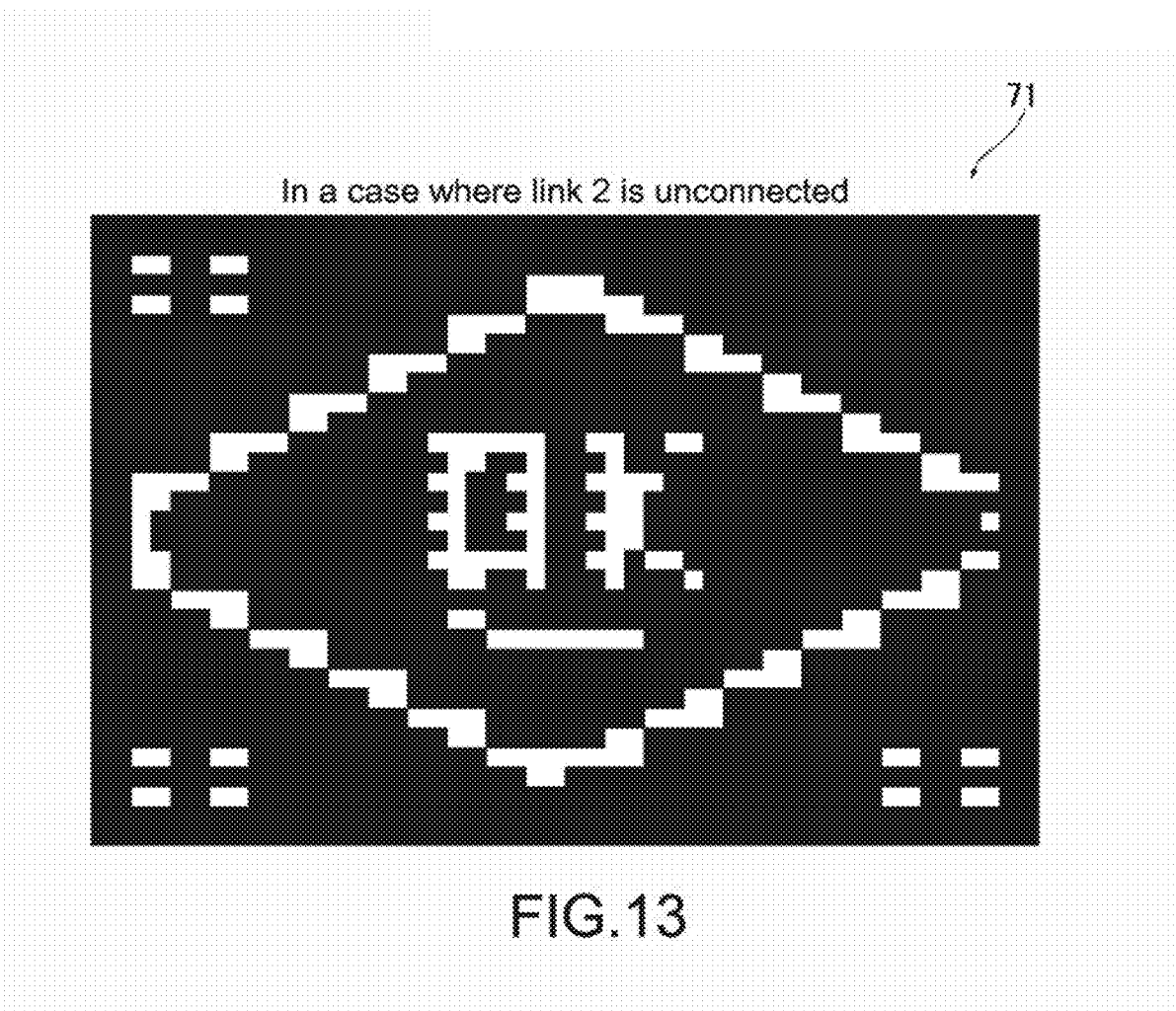
FIG. 13 is a diagram showing the marker image 71 in a case where the link 2 is unconnected.

FIG. 13 is a diagram showing the marker image 71 in a case where the link 2 of the CCU 20 is unconnected.

Also in this case, the OK pattern 711 of the marker image 71 is broken. This allows the user to recognize that any one of the four links is not correctly connected.

In addition, in this case, the connection confirmation pattern 713b arranged at the upper right divided area corresponding to the link 2 is undisplayed. This allows the user to recognize that the link 2 is unconnected.

As described above, according to the embodiments, the cable connection error of each link can be visually found easily from the displayed marker image 71. Also, a broken degree of the diamond pattern 712 of the marker image 71 shows the link having the cable connection error. Furthermore, presence or absence of the display of the connection confirmation patterns 713 of the marker image 71 for each link shows the unconnected link.

Second Embodiment

Next, it will be described that 120 frames of 4K images per seconds are transmitted using eight 3G-SDI links.

Figure 14:
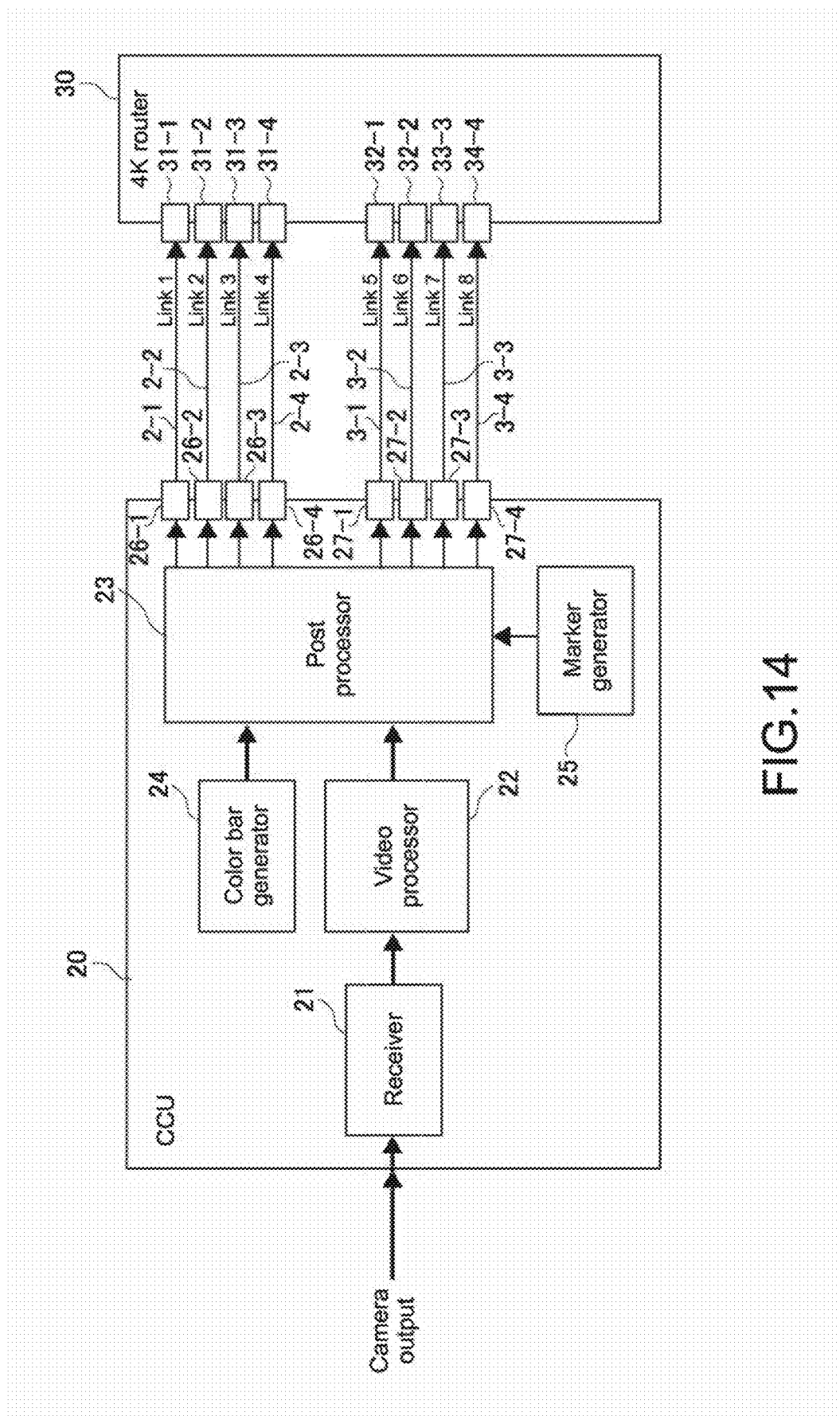
FIG. 14 is a block diagram showing a configuration of the CCU 20 in relation to the video processing and the transmission processing in the 4K camera system 1 according to a second embodiment of the present technology.

FIG. 14 is a block diagram showing a configuration of the CCU 20 in relation to the video processing and the transmission processing in a case where 120 frames of 4K images per seconds are transmitted using eight 3G-SDI links.

The post processor 23 of the CCU 20 divides the 4K image signals of odd-numbered frames output from the video processor 22 into four signal streams by using the 2-Sample-Interleave-Division method, and outputs the respective signal streams through the link 1 to link 4. Also, the post processor 23 divides the 4K image signals of even-numbered frames output from the video processor 22 into four signal streams by using the 2-Sample-Interleave-Division method, and outputs the respective signal streams through the link 5 to link 8.

Here, the link 5 to link 8 are acquired by four coaxial cable 3-1, 3-2, 3-3, and 3-4 that connect four cable connectors 27-1, 27-2, 27-3, and 27-4 of the CCU 20 and cable connectors 32-1, 32-2, 32-3, and 32-4 of the 4K router 30, being a different system from the four coaxial cables 2-1, 2-2, 2-3, and 2-4 that connect the four cable connectors 26-1, 26-2, 26-3, and 26-4 of the CCU 20 and the four cable connectors 31-1, 31-2, 31-3, and 31-4 of the 4K router for the link 1 to link 4.

When the color bar output instruction is issued, the post processor 23 superimposes the marker image generated by the marker generator 25 on a spatial specific position of the color bar generated by the color bar generator 24. In this embodiment, the marker generator 25 feeds odd number frame marker images and even number frame marker images on which the marker images are arranged by a positional relationship that odd-numbered frames of the images and even-numbered frames of the images are spatially exclusive to the post processor 23.

Figure 15A:
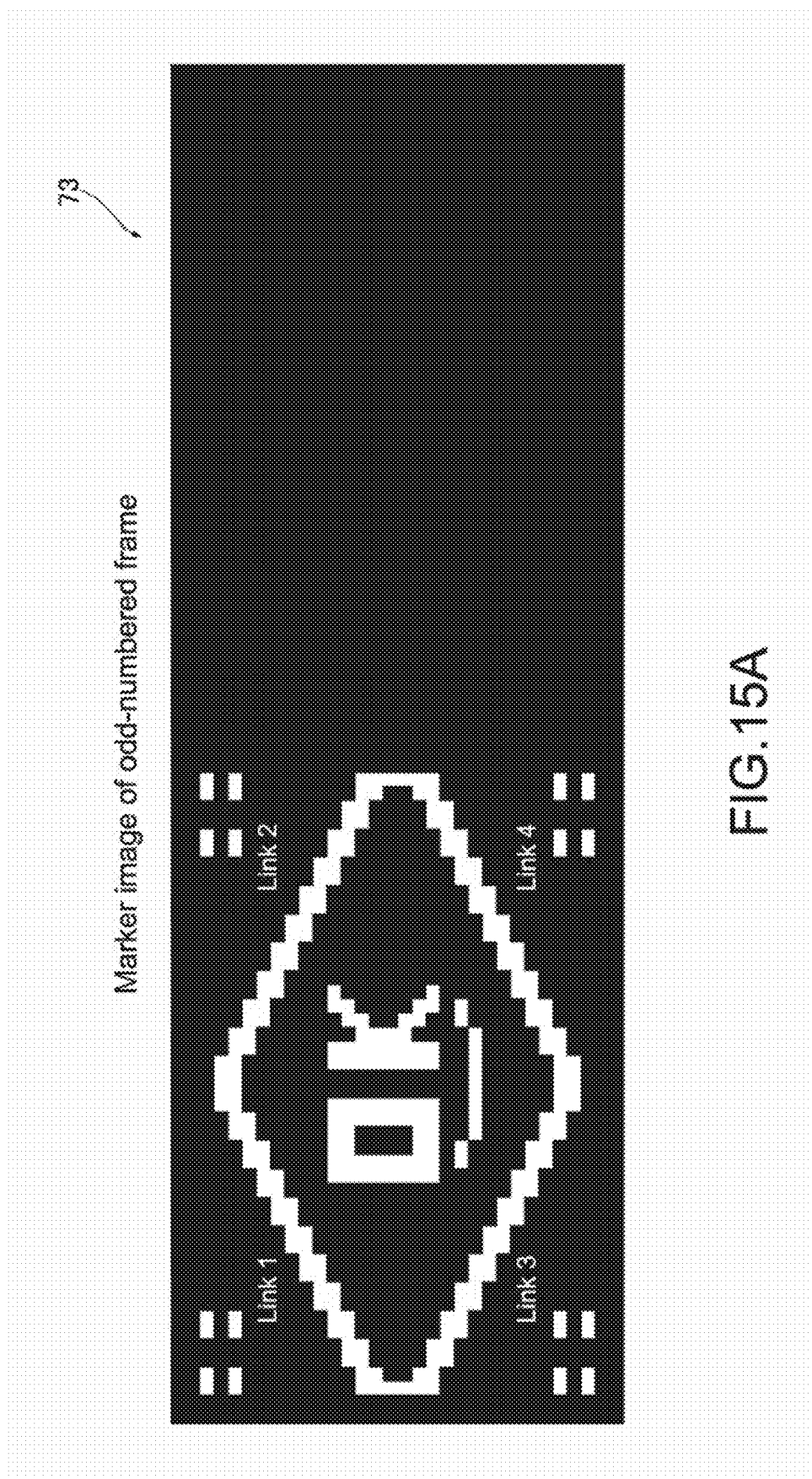
FIG. 15A is a diagram showing an example of an odd number frame marker image 73 generated by a marker generator 25 corresponding to an odd-numbered frame.
Figure 15B:
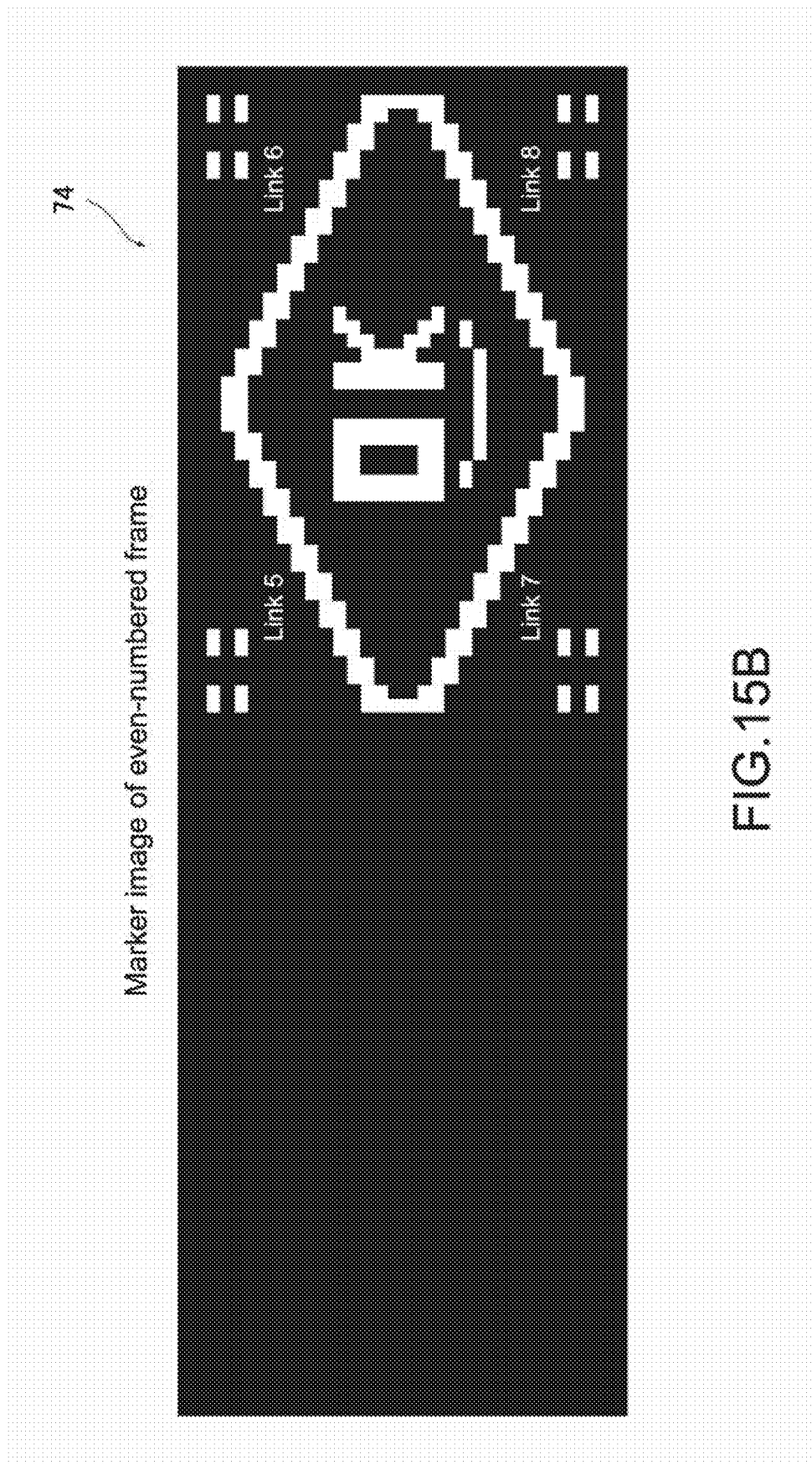
FIG. 15B is a diagram showing an even number frame marker image 74 generated by a marker generator 25 corresponding to an even-numbered frame.

FIG. 15A is a diagram showing an example of an odd number frame marker image 73, and FIG. 15B is a diagram showing an even number frame marker image 74.

As shown in FIG. 15A and FIG. 15B, the odd number frame marker image 73 and the even number frame marker image 74 each has a size where the marker image employed in the first embodiment is horizontally arranged in double. The odd number frame marker image 73 is configured such that the pattern elements of the marker image employed in the first embodiment, i.e., the OK pattern, the diamond pattern, and the connection confirmation pattern are arranged on a left half area, and all pixel values are the maximum luminance values (black) on a right half area. On the other hand, the even number frame marker image 74 is configured such that the pattern elements of the marker image employed in the first embodiment are arranged on a right half area, and all pixel values are the maximum luminance values (black) on a left half area.

Note that the odd number frame marker image and the even number frame marker image may be generated such that, in the areas where the marker images employed in the first embodiment are horizontally arranged in double, the positions of the pattern elements of the marker image may be alternately exchanged at an upper half position and a lower half position.

Alternatively, the area where the pattern elements of the marker image and the area where all the pixel values are the maximum luminance values (black) may be set at the positions spatially apart each other.

The left half area of the odd number frame marker image 73 shown in FIG. 15A where the pattern elements of the marker image are arranged is divided into four, 2 by 2 in a row and a column. An upper left divided area corresponds to the link 1, an upper right divided area corresponds to the link 2, a lower left divided area corresponds to the link 3, and a lower left divided area corresponds to the link 4.

On the other hand, the right half area of the even number frame marker image 74 shown in FIG. 15B where the pattern elements of the marker image are arranged is divided into four, 2 by 2 in a row and a column. An upper left divided area corresponds to the link 5, an upper right divided area corresponds to the link 6, a lower left divided area corresponds to the link 7, and a lower left divided area corresponds to the link 8.

Thus, according to the second embodiment, in a case where 120 frames of 4K images per seconds are transmitted using eight 3G-SDI links, the cable connection error can be visually found relatively easily from the odd number frame marker image 73 and the even number frame marker image 74 displayed at the reception side.

Note that in the second embodiment, each of the odd number frame marker image 73 and the even number frame marker image 74 includes a combination that the pattern elements of the marker image are arranged and all pixel values are the maximum luminance values (black). But it is not limited thereto, the odd number frame marker images and the even number frame marker images may be constituted of only the marker images that are arranged by a positional relationship that odd-numbered frames of the images and even-numbered frames of the images are spatially exclusive. In this case, the marker images generated by, for example, the marker generator 25 may be processed to be superimposed at a positional relationship that the odd-numbered frames and the even-numbered frames are spatially exclusive to the post processor.

<Modification 1>

In the above-described embodiments, the marker image is superimposed on the color bar signals. However, the image on which the marker image is superimposed is not limited to the color bar signals. Other connection confirmation image may be used. Alternatively, the marker image may be superimposed not on the connection confirmation image, but on the image captured by the 4K camera 10, and transmitted.

<Modification 2>

In the above-described embodiments, the case that the 2-Sample-Interleave-Division method is employed is described. However, the present technology is not limited thereto. In other words, the present technology is usable for every method that interleaves an image for a unit of a predetermined number of pixels to divide the image into a plurality of signal streams, and transmits the signal streams via the plurality of links.

<Modification 3>

As stated above, the embodiments according to the present technology are described being the CCU as an example. The image transmission apparatus according to the present technology is applicable to every apparatus that transmits the image via the plurality of links.

The present technology may also have the following configurations.

(1) An image transmission apparatus, including:
a processor that superimposes a marker image for visualizing a connection status of a plurality of links between a transmission side and a reception side on an image displayed at the reception side at a specific position of an image frame, interleaves an image on which the marker image is superimposed for a unit of a predetermined number of pixels to divide the image into a plurality of signal streams, and transmits the signal streams via the plurality of links.

(2) The image transmission apparatus according to (1), in which
the marker image includes a first pattern configured to visualize right or wrong of the connection status of the plurality of links.

(3) The image transmission apparatus according to (1) or (2), in which
the marker image includes a second pattern configured to visualize the link that a connection correspondence relationship is wrong.

(4) The image transmission apparatus according to any one of (1) to (3), in which
the marker image includes a third pattern configured to visualize an unconnected link.

(5) The image transmission apparatus according to any one of (1) to (4), in which
the marker image is configured by a combination of a pixel having a maximum luminance value and a pixel having a minimum luminance value.

(6) The image transmission apparatus according to any one of (1) to (5), in which
the processor is configured to divide the image into four signal streams by using the 2-Sample-Interleave-Division method and to transmit the divided respective signal streams using four links.

(7) The image transmission apparatus according to any one of (1) to (6), in which
in the second pattern, two pixel values of a corresponding link have a relative relationship with six pixel values of other links.

(8) The image transmission apparatus according to any one of (4) to (7), in which
the third pattern includes four connection confirmation patterns corresponding to the respective four links, and in each of the connection confirmation patterns, two pixel values allocated to the link corresponding to itself are exclusively maximum values.

(9) The image transmission apparatus according to any one of (1) to (8), in which
the processor is configured to superimpose the marker image by a positional relationship that an odd-numbered frame of the image and an even-numbered frame of the image are spatially exclusive, interleave the image of the odd-numbered frame and the image of the even-numbered frame after the marker image is superimposed, divide the images into a plurality of signal streams, and transmit the signal streams via the plurality of links.

REFERENCE SIGNS LIST

1 4K camera system
2-1, 2-2, 2-3, 2-4 coaxial cable
10 4K camera
11 camera cable
20 CCU
21 receiver
22 video processor
23 post processor
24 color bar generator
25 marker generator
26-1, 26-2, 26-3, 26-4 cable connector
30 4K router
31-1, 31-2, 31-3, 31-4 cable connector
40 4K monitor
71 marker image
72 minimum configuration pixel
73 odd number frame marker image
74 even number frame marker image
711 OK pattern
712 diamond pattern
713 connection confirmation pattern

The invention claimed is:

1. An image transmission apparatus, comprising:
a processor configured to:
superimpose a marker image on an image displayed at a reception side,
wherein the marker image is superimposed at a specific position of an image frame,
wherein the marker image visualizes a connection status of a connection between a plurality of cable connectors of a transmission side and a plurality of cable connectors of the reception side, and
wherein the plurality of cable connectors of the transmission side and the plurality of cable connectors of the reception side correspond to a plurality of links that connects the transmission side and the reception side;
interleave the image on which the marker image is superimposed for a unit of a determined number of pixels to divide the image into a plurality of signal streams; and
transmit the plurality of signal streams via the plurality of links.

2. The image transmission apparatus according to claim 1, wherein the marker image includes a first pattern configured to visualize one of right or wrong of the connection status of the connection between the plurality of cable connectors of the transmission side and the plurality of cable connectors of the reception side.

3. The image transmission apparatus according to claim 2, wherein the marker image further includes a second pattern configured to visualize a link of the plurality of links for which a connection correspondence relationship between the plurality of cable connectors of the transmission side and the plurality of cable connectors of the reception side is wrong.

4. The image transmission apparatus according to claim 3, wherein the marker image further includes a third pattern configured to visualize an unconnected link of the plurality of links.

5. The image transmission apparatus according to claim 4, wherein the marker image is configured by a combination of a first pixel having a maximum luminance value and a second pixel having a minimum luminance value.

6. The image transmission apparatus according to claim 1, wherein the processor is further configured to:
   divide the image into four signal streams based on a 2-Sample-Interleave-Division method; and
   transmit the divided four signal streams via four links.

7. The image transmission apparatus according to claim 6, wherein the marker image includes a second pattern in which two pixel values of a link of the plurality of links have a relative relationship with six pixel values of other links of the plurality of links.

8. The image transmission apparatus according to claim 7, wherein
   the marker image includes a third pattern that includes four connection confirmation patterns corresponding to the four links, and
   in each connection confirmation pattern of the four connection confirmation patterns, two pixel values allocated to the link of the plurality of links are exclusively maximum values.

9. The image transmission apparatus according to claim 1, wherein the processor is further configured to:
   superimpose the marker image based on a positional relationship that an odd-numbered frame of the image and an even-numbered frame of the image are spatially exclusive;
   interleave the image of the odd-numbered frame and the image of the even-numbered frame after the marker image is superimposed;
   divide the image of the odd-numbered frame and the image of the even-numbered frame into the plurality of signal streams; and
   transmit the plurality of signal streams via the plurality of links.

10. A link status confirmation method, comprising:
   superimposing, by a processor, a marker image on an image displayed at a reception side,
   wherein the marker image is superimposed at a specific position of an image frame,
   wherein the marker image visualizes a connection status of a connection between a plurality of cable connectors of a transmission side and a plurality of cable connectors of the reception side, and
   wherein the plurality of cable connectors of the transmission side and the plurality of cable connectors of the reception side correspond to a plurality of links that connects the transmission side and the reception side;
   interleaving, by the processor, the image on which the marker image is superimposed for a unit of a determined number of pixels to divide the image into a plurality of signal streams; and
   transmitting the plurality of signal streams via the plurality of links.

* * * * *